United States Patent [19]

Young

[11] Patent Number: 4,823,970

[45] Date of Patent: Apr. 25, 1989

[54] GASKET RETAINING CAP MEMBER AND METHOD OF FORMING SAME

[75] Inventor: Larry L. Young, Arab, Ala.

[73] Assignee: Ryder International Corp., Arab, Ala.

[21] Appl. No.: 111,034

[22] Filed: Oct. 21, 1987

[51] Int. Cl.$^4$ .............................................. B65D 53/02
[52] U.S. Cl. ..................................... 215/329; 215/352; 264/249
[58] Field of Search ................ 215/352, 350; 264/249; 29/243.52, 512, 522 A, 509

[56] References Cited

U.S. PATENT DOCUMENTS

| | | | |
|---|---|---|---|
| 2,087,969 | 7/1937 | Gookin | 29/512 |
| 2,465,144 | 3/1949 | Wyatt | 29/523 UX |
| 3,435,976 | 4/1969 | Owens | 215/352 X |
| 3,754,731 | 8/1973 | Mackal et al. | 29/512 X |
| 4,479,915 | 10/1984 | Tsubouchi et al. | 264/249 |
| 4,648,520 | 3/1987 | Stull | 215/350 |

FOREIGN PATENT DOCUMENTS 2334579  7/1977  France ................... 215/350

Primary Examiner—Donald F. Norton
Attorney, Agent, or Firm—Trexler, Bushnell, Giangiorgi & Blackstone, Ltd.

[57] ABSTRACT

A gasket retaining cap member, and method of forming same, comprising an integral cap member having a downwardly extending annular flange forming an exterior cap wall and a downwardly extending annular retention wall spaced radially inward of the cap wall thereby forming a ring-shaped well therebetween into which a gasket member is placed and thereafter held securely in position by deformation of the retention wall. The method of forming the gasket retaining cap member comprises positioning the cap member, with the gasket placed inside, within a heat staking press which operates to stake deformation into the upper surface of the retention wall thereby causing the retention wall to partially overlie the gasket member and hold it securely in place.

3 Claims, 1 Drawing Sheet

GASKET RETAINING CAP MEMBER AND METHOD OF FORMING SAME

BACKGROUND OF THE INVENTION

This invention relates to a cap member having integral gasket retention structure and a method of forming the same. More particularly, this invention relates to the type of cap member used in combination with a container for storing, cleaning and disinfecting contact lenses.

As a result of a public preference for "soft" as opposed to "hard" contact lenses, the required characteristics of lens cases used for storing and treating contact lenses have changed significantly. These changes are due largely in part to the porous nature of the materials used in the formation of "soft" contact lenses which make the task of minimizing the chances of eye infection caused by bacteria growth on the lenses very difficult, and require daily cleaning, disinfecting and sterilization procedures. A widely used method to perform these daily lens care treatments is generally referred to as the "dry heat" method. The "dry heat" method involves immersing the contact lenses in a saline solution which is contained in the base portion of a lens case which is then capped, sealed and placed directly against the heating element of a separate heating unit with means to accomodate the lens case. Sealing the lens case allows the saline solution contained within to become heated above its normal atmosphere boiling point thereby enabling the treatment process to be more efficiently and effectively carried out. It is apparent that a good cap seal is therefore one of the most important elements involved in satisfactorily completing this type of treatment process.

Other disinfecting procedures, such a "cold sterilizing" using hydrogen peroxide also require the use of sealed containers in which the lenses are stored. A reliable cap seal is also essential to this type of procedure.

In the past, proper sealing of a contact lens case was accomplished by providing a suitable gasket in the cap or cover portion of the lens case. To insure the gasket was held properly in place within the cap, a method of sandwiching the gasket between a cover member and a separate disc-like insert was developed. Properly securing the gasket between the two cap parts required protrusions or lugs formed on one cap part to be sent through aperatures formed in the other cap part, and then welding the two parts together thereby trapping the gasket in place. Such a two-piece plus gasket cap device is seen as part of the combination shown in U.S. Pat. No. 4,337,858.

While such prior art devices work well with respect to sealing the lens case, they are possessed of certain conventional shortcomings. In contrast, the gasket retaining cap member and method of forming the same disclosed by the present invention is particularly well adapted for use with the "dry heat" treatment method and others and, as will become fully apparent below, provides for low-cost efficient production using fewer assembly pieces and less assembly time and effort.

BRIEF SUMMARY OF THE INVENTION

It is an object of this invention to provide an improved cap member with integral retention means, and a method of forming the same, which allows for significant increases in production outputs and substantial cost savings.

Summarily stated the invention comprises an integral cap member having interior retention structure enabling a gasket to be positioned within the cap during formation thereof, and thereafter securely held in proper position to function as an effective seal against fluid and pressure loss. The cap member has two downwardly extending annular flanges, the outermost of which forms an exterior radial cap wall having internal threads for selectively mating with an associated contact lens case base portion and knurling on an external surface to faciliate manual gripping and rotating of the cap member. A second downwardly extending annular flange forming a retention wall is disposed radially inward of and does not extend vertically downward as far as the exterior cap wall flange.

During manufacture of a cap member, a gasket member is easily inserted into a ring-shaped well left between the two downwardly extending annular flanges. The cap member and gasket are then placed in a heat staking press which operates to stake and indent an upper surface of the retention wall into and partially overlying the inserted gasket.

The resultant cap member can be visually inspected for proper gasket placement and combined with a contact lens case base portion to be used for contact lens storage and treatment procedures. Adaptability to rapid production methods and elimination of separate cap assembly pieces, and any associated ultrasonic welding requirements as required by prior art designs, guarantee significant cost savings over high volume production outputs.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may become included within the spirit and scope of the invention, as defined by the claims appended hereto.

Figure 1:
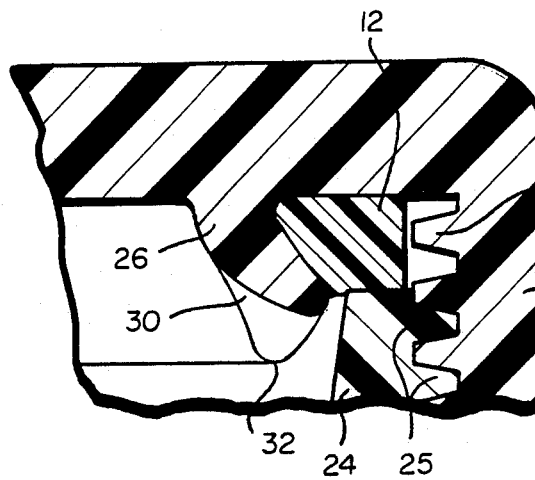
FIG. 1 is an enlarged fragmentary sectional view taken along line 1—1 of FIG. 2 showing the cap member and gasket held in place.
Figure 2:
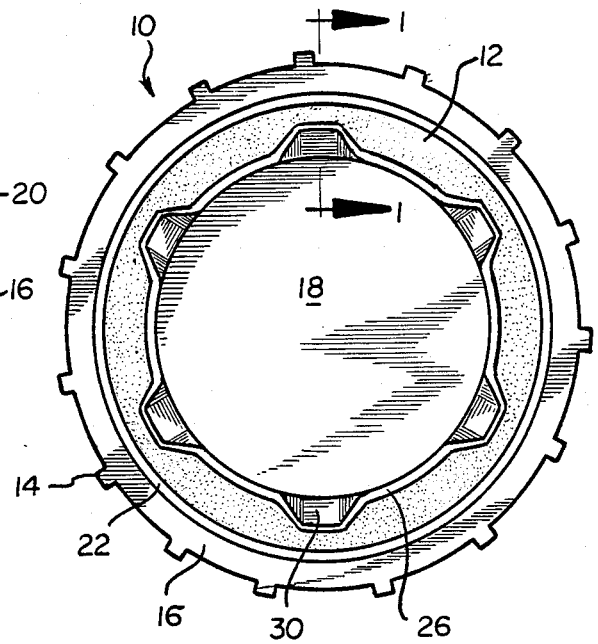
FIG. 2 is a plan view of the bottom of the gasket retaining cap member.

Turning first to FIG. 2, it will be seen that the gasket retaining cap member, designated generally as 10, comprises an integral one-piece body, housing a gasket member 12. Knurling 14 is provided about the perimeter of a peripheral downwardly extending annular cap wall 16 which depends from a disc-like base wall 18. The knurling 14 faciliates manually rotating the cap member 10 onto an associated container 24, a portion of which is shown in FIG. 1. Selective engagement between the cap member 10 and, for example, a container such as a contact lens case base portion 24 is accomplished in a conventional manner by providing screw threads 20 around an interior surface 22 of the annular cap wall 16 and mating the cap member 10 with a complimentary pattern of threads 25 provided on the lens case base 24.

Upon closer inspection of FIGS. 1 and 2, it will be seen that a retainer wall 26 is provided in the form of a second downwardly extending annular flange located radially inward of cap wall 16. In illustrated form, the retainer wall 26 is concentric with, but of lesser diameter than the annular cap wall flange 16, thereby defining a ring-shaped well 28 best seen in FIG. 3. It will also be noted that the maximum height dimension of retainer wall 26 is considerably shorter than the maximum height dimension of cap wall 16. As a result of this difference in maximum height, it will be appreciated that the screw threads 20 of cap wall 16 will always have sufficient vertical distance to allow for adequate meshing with the cooperating threads 25 of an associated lens case base portion 24, without interference from the retainer wall 26.

Referring now primarily to FIG. 1, gasket member 12 is shown securely held and properly positioned in ring-shaped well 28. With the gasket 12 so disposed and in keeping with one of the principal objects of the invention, a tight seal will now result when the cap member 10 is joined as described above with a lens case 24. Fluid and gas will therefore be prevented from migrating past the gasket member 12. Securement of the gasket 12 in the position illustrated in FIG. 1 is accomplished by staking the circumference of the gasket 12 to form indentations 30 in a top edge 32 of retainer wall 26 such that the portions 30 thus deformed will overlie the gasket 12.

Securing the gasket 12 within the cap member 10 in this manner presents several advantages over the means used in the prior art. For instance, it is clearly evident that the holding action caused by the staked indentations 30 will not be disturbed by repeated removal and replacement of the cap member 10. FIG. 1 shows that the complimentary pattern of threads 25 will not impinge upon the indentations 30 even if the cap member 10 was over-tightened. Another advantage lies in the fact that no separate components or ultrasonic welding is required to secure the gasket 12 into place. The integral nature of the gasket retainer wall 26 allows for increases in production outputs ranging from a minimum of 50% to a maximum of over 100%, largely due to the elimination of time required for assembling separate insert pieces and welding. Obviously, at high-speed modern rates of production these production output increases translate quickly into significant economic benefits. It will also be noted that visual inspection of the gasket 12 is unobstructed excepting the relatively small area covered by the indentations 30. The capability of quickly, visually inspecting the gasket 12 speeds and improves quality control and helps limit future sealing problems.

Having observed the details of the gasket retaining cap member 10, attention may now be given to the method of forming such a cap member. The formation operation may be understood upon reference to FIGS. 3-5.

Figure 3:
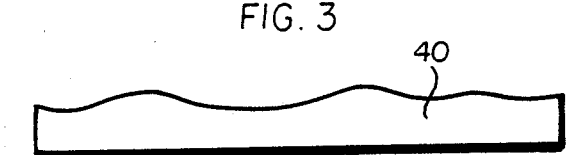
FIG. 3 is a sectional side elevation showing the cap member positioned in an open heat staking press prior to having a staking horn closed upon it.

FIG. 3 shows a cap member 10 positioned in the press pedestal 34 of a heat-staking press designated generally as 36. At this juncture in the formation method, indentations 30 are non-existent and retainer wall 26 comprises a substantially smooth vertical annular flange. With the cap member 10 in this configuration, gasket means 12 is easily placed in the ring-shaped well 28. It will be appreciated that the maximum width of gasket 12 will always be less than the minimum width of ring-shaped well 28 thereby enabling the gasket to fall under its own weight into proper position without obstruction.

Figure 4:
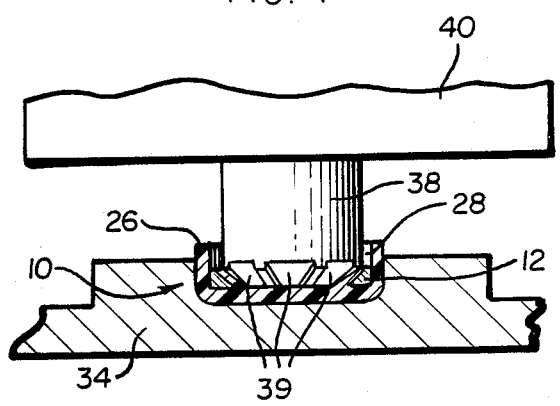
FIG. 4 is a sectional side elevational view similar to FIG. 3 showing the heat staking press in the closed position.

FIG. 4 shows the next stage of the formation method wherein a heated staking horn 38 incorporated into an upper portion 40 of the heat-staking press 36 closes down upon cap member 10. The staking horn 38 includes a series of spaced, radially disposed projections or protuberances 39. Accordingly as the horn 38 is brought into contact with the wall 26, the projectures 39 will compressingly impinge upon retainer wall 26 thereby molding or forming indentations 30 therein under the influence of both heat and compressive forces. Once formed, the rigid indentations 30 overlie and tend to force the gasket 12 outwardly into cap wall 16 and vertically into cap top 18 thereby resulting in a unique gasket retention structure capable of effectively securing a gasket 12 in proper position over an extended period of time.

Figure 5:
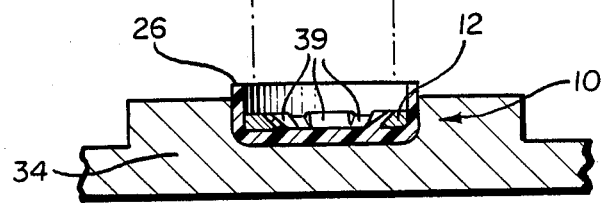
FIG. 5 shows the heat staking press in the same position as FIG. 3 after the staking process has been completed.

Finally, as seen in FIG. 5, the staking horn 38 is withdrawn allowing the finished gasket retaining cap member 10 to be removed from the press 36 and completing the formation process.

The invention is claimed as follows:

1. A gasket retaining cap member comprising: a peripheral downwardly extending annular cap wall having a threaded portion on an inner surface thereof for selectively joining said cap member with a complimentary pattern of threads of an associated container; an integral downwardly extending annular retention wall located radially inward of said cap wall and defining an inner wall of a ring-shaped well formed between said cap wall and said retention wall; and gasket means disposed in said ring-shaped well between said retention wall and said cap wall, said retention wall having a series of circumferentially spaced indentations formed in an upper surface thereof so as to bring selected portions of said retention wall into overlying relation with said gasket while still allowing the gasket to be subjected to visual inspection and thereby insuring said cap member will form a tight and perfect closure when secured to an associated container thus preventing fluid or gas from permeating the cap member and associated container combination.

2. The gasket retaining cap member of claim 1, wherein a maximum height dimension of said retaining wall is less than a maximum height dimension of said cap wall thereby allowing exposure of a sufficient amount of said threaded portion on said inner surface of said cap wall for adequately engaging with said complimentary pattern of threads of an associated container.

3. A method of forming a gasket retaining cap member, said method comprising the steps of:
   (a) providing a cap member having a peripheral downwardly extending annular cap wall and an integral downwardly extending annular retention wall located radially inward of said cap wall and thereby defining a ring-shaped well located between said cap wall and said retention wall,
   (b) providing a gasket member and positioning said gasket member within said ring-shaped well,
   (c) staking an upper surface of said retention wall with a heat-staking press having a series of circumferentially spaced notches formed in a staking horn portion thereof, until said staking horn of said heat-staking press causes sufficient deformation in said retention wall in the form of circumferentially spaced indentations so as to bring said wall into overlying contact with said gasket thereby locking said gasket member in place without interfering with a visual inspection of said gasket member.

* * * * *